United States Patent
Song et al.

(10) Patent No.: US 11,151,227 B2
(45) Date of Patent: Oct. 19, 2021

(54) CONTENT SECURITY ON IN-VEHICLE ENTERTAINMENT

(71) Applicant: Panasonic Avionics Corporation, Lake Forest, CA (US)

(72) Inventors: Aihua Helen Song, Aliso Viejo, CA (US); Philip Watson, Lake Forest, CA (US); Kwok Liang Poo, Lake Forest, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 272 days.

(21) Appl. No.: 16/514,958

(22) Filed: Jul. 17, 2019

(65) Prior Publication Data

US 2021/0019380 A1    Jan. 21, 2021

(51) Int. Cl.
*G06F 21/10* (2013.01)
*H04L 9/08* (2006.01)
(Continued)

(52) U.S. Cl.
CPC .......... *G06F 21/105* (2013.01); *H04L 9/0891* (2013.01); *H04L 9/3226* (2013.01); *H04L 63/0428* (2013.01); *H04L 63/062* (2013.01); *H04L 63/0876* (2013.01); *H04L 63/166* (2013.01); *H04N 21/2146* (2013.01); *H04N 21/2347* (2013.01); *H04N 21/2541* (2013.01); *G06F 2221/0768* (2013.01); *H04L 2209/84* (2013.01)

(58) Field of Classification Search
CPC . G06F 21/10; G06F 21/105; H04L 2209/063; H04L 2209/84
See application file for complete search history.

(56) References Cited

U.S. PATENT DOCUMENTS 9,767,298 B2 * 9/2017 Hayashi ............ H04N 21/4405
9,961,373 B2    5/2018 Margis et al.
(Continued)

FOREIGN PATENT DOCUMENTS

WO    2017194231    11/2017
WO    2018178704    10/2018

OTHER PUBLICATIONS

Extended European Search Report from European Application No. 20186527.6 dated Dec. 3, 2020.

*Primary Examiner* — Dao Q Ho
(74) *Attorney, Agent, or Firm* — Perkins Coie LLP

(57) ABSTRACT

A system for providing entertainment on a vehicle for passengers is described. The system includes (a) a server storing media files and corresponding media keys and (b) monitors storing subsets of the media files and the corresponding media keys. The system includes a server disposed on the vehicle to store the media files and the media keys for the vehicle; monitors disposed on the vehicle to present media selections to passengers corresponding to the media files stored by the server, locally, or on other monitors disposed on the vehicle, and receive an input from a passenger for playing one of the selections. The system also includes selectively revoking the media keys on the server or the monitors. Program logic executed by the server and the monitors implements secure, digital rights management processes as they pertain to the media files presented on the vehicle.

19 Claims, 6 Drawing Sheets

(51) Int. Cl.
    *H04L 9/32*         (2006.01)
    *H04L 29/06*       (2006.01)
    *H04N 21/214*     (2011.01)
    *H04N 21/2347*    (2011.01)
    *H04N 21/254*     (2011.01)

(56) References Cited

U.S. PATENT DOCUMENTS

| | | |
|---|---|---|
| 10,097,603 B2 | 10/2018 | Watson et al. |
| 10,136,164 B2 | 11/2018 | Margis et al. |
| 2010/0227681 A1* | 9/2010 | Soemo .................... A63F 13/12 |
| | | 463/29 |
| 2013/0318272 A1 | 11/2013 | Bird et al. |
| 2014/0157370 A1 | 6/2014 | Plattner et al. |
| 2016/0127334 A1* | 5/2016 | Bangole .................. H04L 67/12 |
| | | 713/171 |
| 2018/0212935 A1* | 7/2018 | Iyer ......................... G06F 21/10 |
| 2018/0295426 A1* | 10/2018 | Chen ................. H04N 21/2146 |
| 2019/0007472 A1 | 1/2019 | Watson et al. |

* cited by examiner

CONTENT SECURITY ON IN-VEHICLE ENTERTAINMENT

TECHNICAL FIELD

This document is directed generally to in-vehicle entertainment networks and systems, and in particular to content security solutions for such networks and systems disposed on commercial passenger transport vehicles, such as aircraft.

BACKGROUND

Air travel typically involves journeys over extended distances that at the very least take several hours to complete, and airlines therefore provide on-board in-flight entertainment (IFE) systems that offer a wide variety of multimedia content and other on-board services (e.g., food, games, etc.) for passenger enjoyment. Digital right management (DRM) is mechanism for providing copyright protected media.

SUMMARY

A system for providing entertainment on a vehicle for passengers is disclosed. The system includes (a) a server storing media files and corresponding media keys and (b) monitors storing subsets of the media files and the corresponding media keys. The system includes a server disposed on the vehicle to store the media files and the media keys for the vehicle; monitors disposed on the vehicle to present media selections to passengers corresponding to the media files stored by the server, locally, or on other monitors disposed on the vehicle, and receive an input from a passenger for playing one of the selections. The system also includes selectively revoking the media keys on the server or the monitors. Program logic executed by the server and the monitors implements secure, digital rights management processes as they pertain to the media files presented on the vehicle.

In one exemplary aspect, a method for providing entertainment on a vehicle for passengers is disclosed. The method includes receiving, at a first monitor, a request for a digital rights license corresponding to a media selection, the request originating from a second monitor; authenticating, by the first monitor, the second monitor; responsive to authenticating the second monitor, retrieving, by the first monitor, from a local cache of one or more media keys, a media key corresponding to the media selection; responsive to retrieving the media key, the first monitor (a) generating the digital rights license containing the media key and (b) encrypting digital rights license with the pre-share device key; and transmitting, by the first monitor, the encrypted digital rights license to the second monitor; wherein the first monitor and the second monitor are each disposed on the vehicle; wherein the first monitor is configured to present media selections to passengers corresponding to media files stored on the vehicle and receive an input from a passenger for playing one of the media selections; wherein the first monitor is further configured to store at least a subset of the media files in a local media content storage.

Additionally, the method comprises transmitting, by the first monitor to the second monitor, a media file corresponding to the media selection, the media file being stored in the local media content storage and the media file being encrypted with the media key.

Additionally, the digital rights request comprises (a) a device identifier corresponding to the second monitor and second monitor credentials and (b) a media identifier corresponding to the media selection, wherein the device identifier and credentials are encrypted with a pre-share device key corresponding to the second monitor.

Additionally, the media key, prior to encryption of the digital rights license, is in clear-text format.

Additionally, the first monitor is further configured to recognize that a particular media selection in the received input from a passenger is stored on a particular monitor of a plurality of monitors on the vehicle.

Additionally, the first monitor comprises a hardware-based trusted execution environment that is configured to (a) receive a request for a digital rights license for a specific media, (b) encrypt a device identifier corresponding to the first monitor with device key corresponding to the first monitor, and (c) receive a digital rights license and media key encrypted with the device key, decrypt the digital rights license and the media key, and use the media key to decrypt an encrypted media file stored in the local media content storage. Additionally, the encrypted media file is sourced from a server on the vehicle or sourced from another monitor.

Additionally, the local cache of one or more media keys is protected by a hardware root of trust deployed on the first monitor by requiring a transient key encrypted by a unique key in the hardware root of trust and wherein the unique key is configured to be revocable.

Additionally, the method comprises checking, by the first monitor, whether for each media file stored in the local media content storage a corresponding media key is stored in the local cache of one or more media keys.

Additionally, the method comprises upon determining, by the first monitor, that the local cache of one or more media keys does not contain a media key that corresponds to a locally stored media file, the first monitor generating and transmitting a request to a server on the vehicle for the media key, wherein the server stores media keys corresponding to the media files on the vehicle. Additionally, the request includes credentials of the first monitor and media identifiers corresponding to the media files stored in the local media content storage. Additionally, the method comprises responsive to transmitting the request to the server for the media key: receiving, over transport later security, clear-text media keys corresponding to the list of media files, the clear-text media keys encrypted with the pre-share device key of the first smart monitor; and adding the encrypted clear-text media keys to the local cache of one or more media keys corresponding to respective media identifiers.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
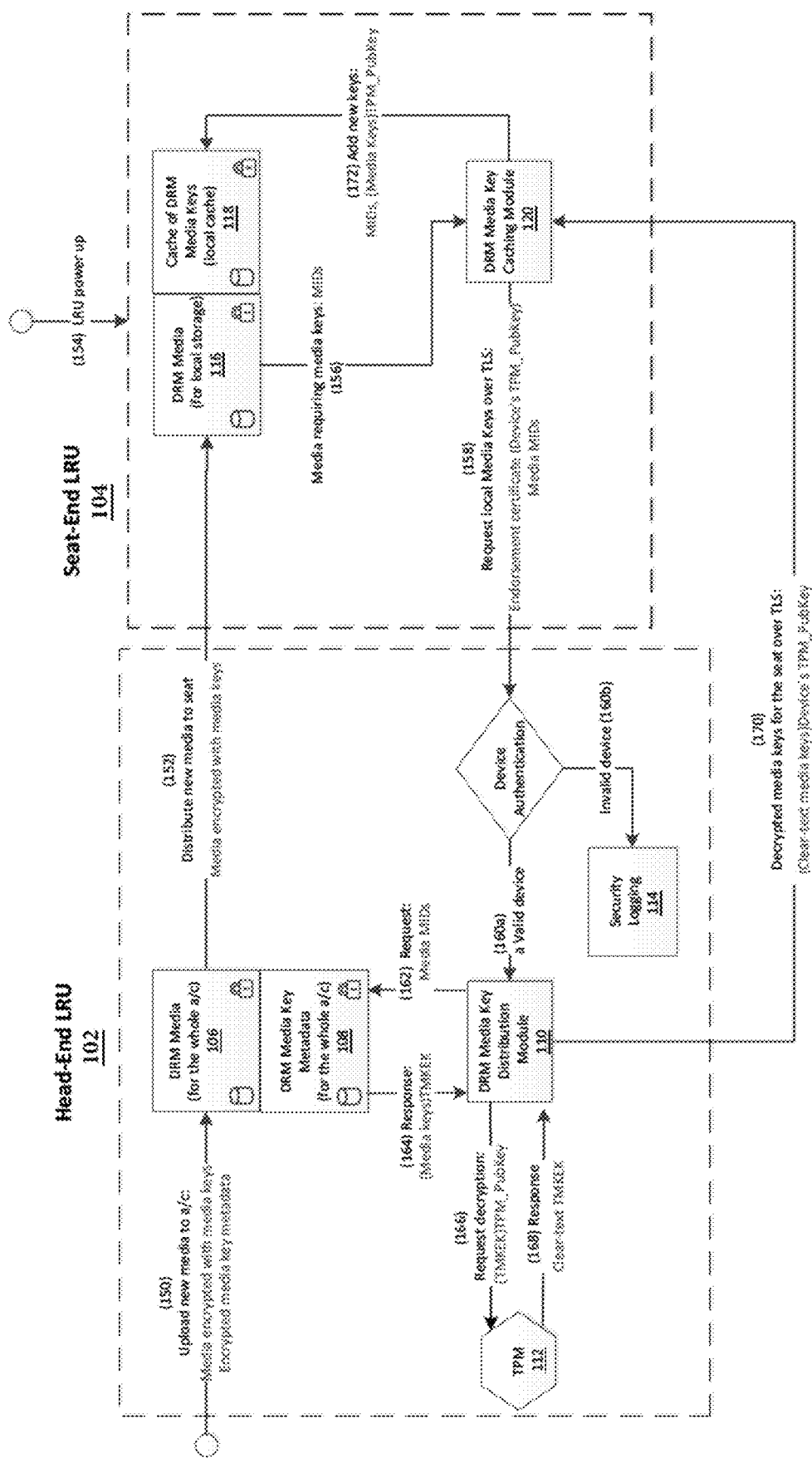
FIG. 1 is a schematic diagram of the distribution of media keys to in-seat smart monitors and the local caching of such distributed media keys by the in-seat smart monitors, in accordance with embodiments of the disclosed technology.

A system for providing entertainment on a vehicle for passengers is disclosed. The system includes (a) a server storing media files and corresponding media keys and (b) smart monitors storing subsets of the media files and the corresponding media keys. The system includes a server disposed on the vehicle to store the media files and the media keys for the vehicle; smart monitors disposed on the vehicle to present media selections to passengers corresponding to the media files stored by the server, locally, or on other smart monitors disposed on the vehicle, and receive an input from a passenger for playing one of the selections. The system also includes selectively revoking the media keys on the server or the smart monitors. Program logic executed by the server and the smart monitors implements secure, digital rights management processes as they pertain to the media files presented on the vehicle.

Presently, entertainment systems for vehicles used in commercial passenger transport are frequently server-based. Specifically, a server stores content, e.g., media files, and provides the content via a network upon demand from client devices operated by users or passengers on the vehicle. Most often, the content is in the form of video and audio files, which are streamed to the client devices over the network. Accordingly, the server is central to operation of the entertainment system. For this reason, server-based systems in the in-flight entertainment field (IFE) are sometimes referred to as server-centric.

A disadvantage of server centric systems is that if the server becomes inaccessible the content stored on the server likewise becomes inaccessible for passengers or users of the client devices. Prior systems have addressed this disadvantage by providing alternative communication paths to the server. Hence, if there is a communication path failure, an alternate communication pathway still exists for accessing content on the server. Some systems provide multiple servers. Should one server become inaccessible, content can still be accessed via the other server. The more robust systems provide both multiple servers and redundant communication pathways.

Other types of IFE systems store content in client devices. In particular, IFE systems typically have client devices mounted at each seat for use by passengers. These systems are sometimes referred to in the IFE field as seat-centric. Seat-centric systems have an advantage in that they are not reliant on a server. However, there are disadvantages. For instance, client devices do not have the performance capability of a server and have far less storage capacity for content. In addition, there is a necessity for managing the content. Content is typically updated periodically as newer content becomes available. In vehicles having hundreds of seats, it is time consuming to load new content on each new client device.

To address these limitations, a vehicle entertainment system in which monitors that store and present media stored thereon to a user are further configured to request and/or serve media from other monitors is taught in U.S. Pat. No. 9,961,373 ('373), VEHICLE ENTERTAINMENT SYSTEM (May 1, 2018) to P. Margis, C. Rhoads, P. Watson, N. Blackwell, A. Szilagyi, and N. Bedekar, which is presently co-assigned by Panasonic Avionics Corporation, Lake Forest, Calif., and is incorporated by reference herein in its entirety. Also teaching such subject matter are the following applications, which are also co-assigned at this time of this filing: U.S. patent application Ser. No. 15/145,604, VEHICLE ENTERTAINMENT SYSTEM (filed May 3, 2016) to P. Watson, C. Rhoads, N. Blackwell, and S. Bates; U.S. patent application Ser. No. 15/909,852, VEHICLE ENTERTAINMENT SYSTEM (filed Mar. 1, 2018) P. Margis, C. Rhoads, P. Watson, N. Blackwell, A. Szilagyi, and N. Bedekar; and U.S. patent application Ser. No. 16/125,146, VEHICLE ENTERTAINMENT SYSTEM (filed Sep. 7, 2018) to P. Watson, C. Rhoads, N. Blackwell, and S. Bates, each of which is incorporated by reference in its entirety.

However, while the vehicle configurations taught in '373 utilize a software-based media security solution, techniques taught herein increase the security level of media that is ever increasing in sophistication, capability, and size, e.g., ultra-high definition, 4K media, 8K media, and so on. Techniques taught herein provide video-on-demand services of copyright protected media utilizing a Digital Right Management (DRM) protection method that is hardware based. For example, the innovation may be implemented by aircraft configurations that deploy in-seat monitors configured to display copyright protected media that requires and utilize a DRM license-based security solution.

As an overview, the innovative system described herein protects media, such as high-value media, with encryption, and decrypts such media before providing, e.g., playing or streaming, it to the user. The keys used for decrypting the media are referred to herein as media keys. These media keys are embedded in the software. When the monitor, such as for example an in-seat smart monitor (referred to herein as a smart monitor or simply a monitor) on a passenger aircraft (referred to herein as a Seat-End) has lost connection to the server on the aircraft (referred to herein as the Head-End), each smart monitor is still able to access the media keys and use them to decrypt the media. The media and media keys had been previously streamed to the smart monitor and the smart monitor had stored the media and media keys in a local content storage and local media key database, respectively. In accordance with embodiments herein, the media and media keys were sourced to the smart monitor by either the server or another smart monitor on the aircraft, either manner being compliant with industry group requirements.

Embodiments herein address real-world problems, such as movie studios imposing on IFE vendors a higher level of security to source premium content (e.g., 4K media) via specific security requirements for copyright-protected media. Thus, solutions taught herein may include aircraft configurations that utilize hardware-anchored Digital Right Management (DRM) licenses. For example, and according to an embodiment, in preparation of sending media to the aircraft, the groundside operations bundles and transmits to the aircraft the encrypted media with the specific media keys that are used onboard the aircraft to decrypt the media. When the media as well as the media keys are uploaded to the aircraft, the media is stored in encrypted form and the set of media keys are stored in a media key database.

In an embodiment, the requirements include a hardware root of trust (HW ROT) both on the video clients and the license servers, where the license server is the entity that issues licenses for a certain title to each video client. In one embodiment, this requirement implemented in the traditional IFE system of streaming servers on the head-end to video clients at each seat-end, that each head-end add such a HW ROT. In another embodiment, in which is reflected that the IFEs have been adding or transitioning to seat-centric systems, either with no server or with each seat being a server, the server HW ROT requirements are met at the seat-end. It should be appreciated that embodiments herein also address and provides solutions to head-end failure conditions discussed in detail below.

In accordance with an embodiment, before the system is able to display the media, for example a movie, the in-seat smart monitor obtains the specific media key to decrypt such DRM protected media. The in-seat smart monitor follows the high-level process described below to obtain the media keys:
  The in-seat smart monitor generates a DRM license request for a media title and submits its device credentials along with the request.
  The DRM license server authenticates the in-seat smart monitor by verifying its credentials.
  The DRM license server provides the DRM license to the successfully authenticated device (the in-seat smart monitor).
  The in-seat smart monitor uses the DRM license to obtain the media key for the media title.

It should be appreciated that the DRM license server on the head-end server can represent a single point of failure. In the event of such a server malfunction or network connectivity loss between the in-seat smart monitor and such server, the system would not be able to display copyright protected media (which may be known in the industry as a dark flight). Embodiments herein provide robust and resilient solutions that avoids dark flight conditions. In one embodiment, a DRM license server is not added to every in-seat smart monitor, which, doing so may increase the operational costs and complexity to manage such a large number of DRM license servers onboard the aircraft.

It further should be appreciated that airlines may upgrade only the in-seat smart monitors of their existing IFE systems, without upgrading the head-end server. In this situation, the head-end server may not meet the HW ROT requirements, the head-end server being of previous generation before those requirements existed. Thus, embodiments herein enable in-seat smart monitors to act as DRM proxy servers so that users can consume copyright protected media.

Embodiments herein may apply to any premium content that requires high level security protection and which calls for hardware-anchored DRM licenses. As such, the license server can be any commercial or propriety software. One example of such software is provided by Widevine Technologies, Kirkland, Wash. In the description of this innovation, "Widevine Server" and details thereof may be used as an example for discussion purpose only. Accordingly, the DRM license and the device credentials (e.g., device keys and device identifiers (IDs)) mentioned in this document may reflect use of Widevine terminologies, however, such licenses and credentials may be any DRM license and device credentials and are not limited to those of Widevine Technologies.

In an embodiment, the innovative methodology consists of two parts at the high level:
  Distribution of media keys for copyright protected media that is cached and/or stored locally by in-seat smart monitors.
  Generation of DRM licenses by the in-seat smart monitors that act as DRM proxy servers providing audio and video on demand (AVOD) and other such on-demand services to other in-seat smart monitors acting as clients.

An embodiment of the distribution of media keys to the in-seat smart monitors and the local caching of such distributed media keys by the in-seat smart monitors can be understood with reference to FIG. 1. The embodiment is based on a head-end server 102 that is a line-replaceable unit (LRU). Head-end server 102 is communicably connected to the in-seat smart monitors, as shown by seat-end LRU 104. The smart monitors are also line-replaceable units. In an embodiment, head-end server 102 includes two storage units, DRM Media 106 and DRM Media Key 108. It should be appreciated that these storages may be logically separated (as shown), may combined into one storage, or, depending on the configuration, could be remote to head-end server 102. Head-end server 102 also includes a configured DRM media key processor, which is shown as DRM Media Key Distribution Module 110. Further, head-end server 102 includes a trusted execution environment to provide confidentiality and integrity to any application execution and data inside the trusted execution environment. This trusted execution environment is shown as Trusted Platform Module (TPM) 112. Further, head-end server 102 includes a security logging store, for instance when a device requesting a media key is determined to be invalid.

In an embodiment, seat-end LRU 104 (also referred to as just seat-end), includes a local DRM media storage 116 for storing media files and a local cache of DRM media keys 118 for storing the media keys. In an embodiment, the media keys correspond to the media files stored in DRM media storage 116. Seat-end 104 also includes a DRM media key caching processor configured to request media keys from head-end server 102.

The interaction between head-end server 102 and seat-end 104 in accordance with embodiments herein can be further understood with reference to the following logic flow in view of FIG. 1.

At step 150, new media intended for the passengers on the entire aircraft is uploaded to the DRM media database on the head-end server from groundside operations. Each media, such as a popular new movie, is encrypted with a media key. Also uploaded in this bundle are any encrypted media key metadata. At step 152, the head-end server distributes the new media to each of the smart monitor seats. The distributed media is still encrypted with the media keys. At power-up, step 154, the in-seat monitor checks if it has all the media keys already stored for each of its locally stored media files. More specifically and in an embodiment, at step 156, the smart monitor identifies the media identification (MID) for each media file for which a media key is needed.

At step 158, if not all media keys are present for any reason, the smart monitor generates a request to be sent to the head-end server that stores the media keys for all media. Such request includes the credentials (e.g., TPM keys) of the smart monitor and a list of media, e.g., a list of MIDs, for which a media key is needed. In another embodiment, the request includes the list of all media that is stored by the smart monitor and an indication of which media keys are needed. It should be appreciated that other variations can be implemented for indicating which media keys are needed.

At step 160a, after receiving the request, the head-end server authenticates the smart monitor sending the request, by verifying the credentials sent in the request. Similarly, at step 160b, after receiving the request, the head-end may try to authenticate the smart monitor sending the request, using the credentials sent in the request, however determines that the device is invalid. In this case, the head-end server logs this device in a local storage for further processing of discovering of invalid smart monitors onboard the aircraft.

After authenticating the smart monitor, the head-end server retrieves the media keys from the system's media key metadata database. More specifically, at step 162, after the smart monitor has been authenticated, the DRM media key distribution module sends a request to the media key metadata database. In an embodiment, the request includes the MIDs for which media keys are needed.

At step 164, the media key metadata database returns the media keys, still encrypted, to the DRM media key distribution module. In an embodiment, the media keys are encrypted by a temporary media keys encrypting key (TMKEK) that can only be unlocked by the DRM server's TPM, as shown.

At step 166, the DRM media key distribution module makes a request to the TPM to decrypt the media keys. The request includes the media keys encrypted by TMKEK and encrypts the TMKEK with the key of the TPM.

At step 168, the TPM, which had decrypted the media keys internally, returns to the DRM media key distribution module the media keys in clear-text format. The DRM media key distribution module encrypts the clear-text media keys with the key that only the smart monitor can unlock. In an embodiment, the key that only the smart monitor can unlock was sent in the request at step 158.

At step 170, the DRM media key distribution module transmits the encrypted clear-text media keys to the smart monitor. More specifically, the encrypted clear-text media keys are sent to a DRM media key caching module or configured processor. In an embodiment, the transmission occurs over secure transport layer.

Then, at step 172, the DRM media key caching module adds such received keys, still encrypted with the smart monitor key, and their respective MIDs to the smart monitor's local cache of DRM media keys for decrypting the media upon successful request by a passenger at the seat corresponding to the smart monitor.

In another embodiment, each seat may act as a license server. This embodiment reflects an alternative design that does not rely on having a head-end with the hardware changes to support the HW ROT requirements, such as for the partial upgrade mentioned earlier. In this situation, the license server may run at each seat, instead of on the head-end. It should be appreciated that operational and/or monitoring overhead of each license server may increase. In this embodiment, the head-end does not have access to the media keys, that access depending on a hardware ROT which it does not have. However, the head-end may still serve as a central distribution point for the set of encrypted media keys. As part of media distribution to each seat, the media key database is also sent to every seat. Alternatively, in other embodiments, the media key database may be split into segments corresponding to the different media stored in each seat, such that each seat holds a subset of media and a subset of media keys, those keys granting access to the same encrypted media files stored on the same seat. Access to each media key database is protected by the HW ROT, either by a common key or, more securely, by a transient key encrypted by a unique key in each HW ROT. In an embodiment, it is required that each license server have a unique key such that it can be revocable. It should be appreciated that such this requirement may increase the operational overhead, of tracking each license server.

Whether the head-end acts as license server, each smart monitor acts as the license server, or a combination thereof, the same second process of providing DRM licenses from server to client applies and is described below.

Figure 2:
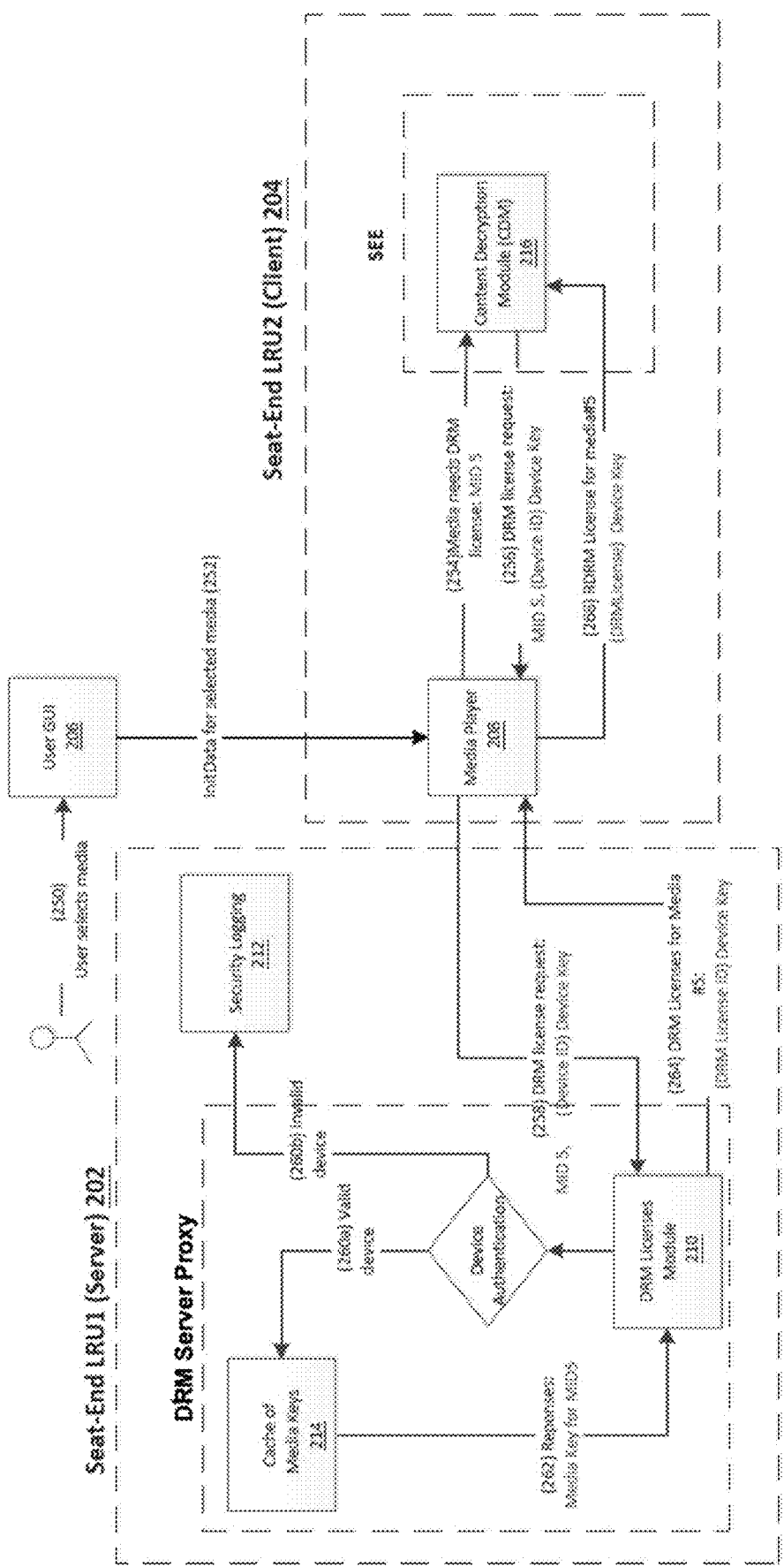
FIG. 2 is a schematic diagram of providing DRM licenses from a smart monitor server to a smart monitor client, in accordance with embodiments of the disclosed technology.

An embodiment of providing DRM licenses in a vehicle entertainment system from a head-end or smart monitor server to a smart monitor client can be understood with reference to FIG. 2. In the embodiment, a first seat-end LRU1 202 (first monitor) acts as an AVOD server and another seat-end, seat-end LRU2 204 (second monitor) acts as a client. While the description that follows describes the server-like capabilities as being on the first monitor 202 and the client-like capabilities as being on the second monitor 204, it should be appreciated that in an embodiment, the seat-end AVOD server also includes AVOD client capabilities and that the seat-end AVOD client may also include the AVOD server capabilities.

In an embodiment, seat-end server 202 includes a cache of media keys 214, DRM licenses module or configured processor 210, and a security logging store 212.

In an embodiment, seat-end client 204 includes a media player, which is configured to accept and recognize input from a user GUI 206. Also, seat-end client 204 includes a trusted execution environment as described above. Here, such trusted execution environment is referred to as Secure Executable Environment (SEE). The SEE includes a content decryption module or configured processor.

In operation and in accordance with an embodiment, the in-seat monitor (client) identifies another in-seat monitor (server) that is available to provide the specific media selected by the passenger. Prior to being able to display the media, the client has to obtain the specific media key for the media, as the other smart monitor server transfers the media to the client in encrypted form. As such, the in-seat monitor (client) first has to generate a DRM license request with the content provided by its SEE.

At step 250, a user selects media via the user GUI.

At step 252, the user GUI transmits initial data collected for the selected media to the media player in the seat-end client.

At step 254, the client generates a request internally for the DRM license required by the media title. More specifically, the media player sends the request to the content decryption module of the SEE. At step 256, the content decryption module generates and sends a DRM license request to the media player. Such DRM license request includes the media identifier (MID) for the requested media. For purposes of understanding, media #5 is shown as an example of the media for which a license is requested. Thus, the request is shown to include MID 5 and the (client) device ID encrypted with the pre-shared client key. It should be appreciated that other media-related data can be transmitted and used to identify such media such as, for example, the title of the media.

At step 258, after receiving the DRM license request, the seat-end server authenticates the seat-end client by verifying its credentials. At step 260b, if the authentication fails, the device is determined to be invalid and such invalidation is noted in the security logging store. At step 260a, the device is authenticated and a request is made to the cache of media keys to retrieve the media key for media #5.

At step 262, the seat-end server sends the media key for media #5 to the internal DRM license module generates the DRM license containing the media key. Further, at step 264, the system securely transfers the media key in clear-text format to the client by encrypting it with a key that is only meaningful to the receiving client, the pre-share client key.

At step 268, the seat-end client receives the encrypted media key, decrypts the media key by sending the encrypted key to the content decryption module in the SEE. Subsequently, the seat-end client uses the media key to decrypt the encrypted media that it sources from the seat-end server.

In an embodiment, if the media keys cached locally with the in-seat monitors are compromised, measures may be taken to revoke all the DRM license servers onboard the aircraft for any new media. This means the whole aircraft is revoked, to protect new media uploaded to the aircraft. Until the problem for the compromise is root caused, the newly uploaded media is not be available for viewing by cabin crew or passengers on the aircraft. Once the problem is root caused and fixed, then the DRM license servers may be restored back into service. In another embodiment, the system is configured to revoke the license server key of a single seat monitor, when that is the compromised or lost or stolen unit. Only that seat is impacted by such a revocation. However, as mentioned above, tracking such numerous keys may increase overhead.

Figure 3:
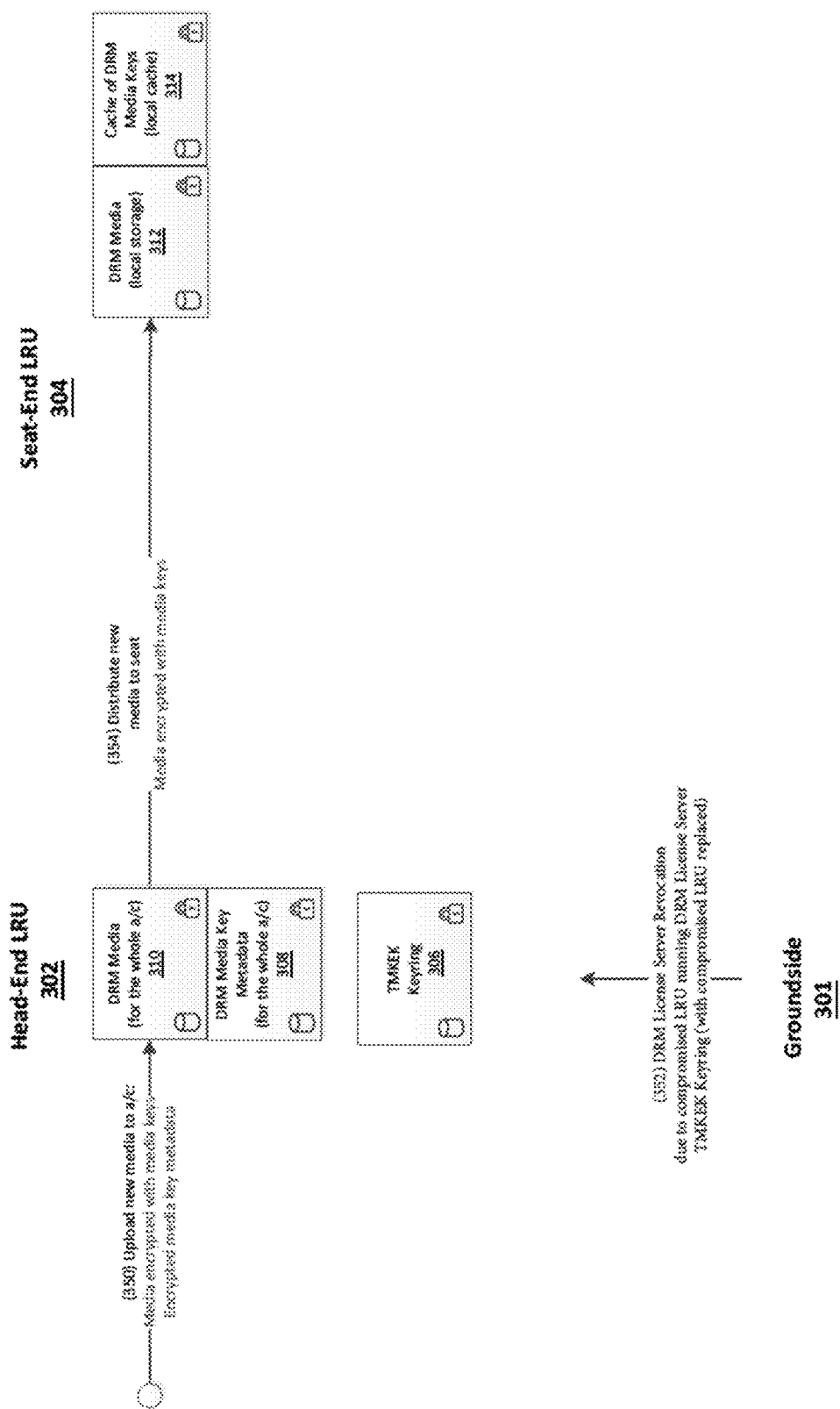
FIG. 3 is a schematic diagram of the revocation process, in accordance with embodiments of the disclosed technology.

A DRM server revocation process can be understood with reference to FIG. 3. The groundside controls 301 initiate the revocation process by transmitting a revocation command to the head-end LRU server 302 (head-end server), which is communicably connected to the smart monitors on the vehicle, as shown by seat-end LRU 304 (seat-end).

Head-end 302 includes the DRM media storage 310 to store media for the entire aircraft, the DRM media key and metadata storage 308 to store the media keys for the media on the aircraft, and a TMKEK keyring storage 306.

Seat-end 304 includes the local DRM media storage 312 and the local cache of DRM media keys 314. As mentioned above, the media and media keys stored on seat-end 304 may be a subset of the entire sets of each on the head-end 302.

At step 350, new media for the vehicle or aircraft continues to be uploaded to the head-end server. As usual, the media is encrypted with media keys and encrypted media key metadata is also provided.

The revocation process of a DRM license server effectively begins at step 352. Here, a server revocation commend due to a compromised smart monitor is transmitted the head-end. The command includes the TMKEK keyring, in which the TMKEK encrypted by the compromised DRM license server's key is removed and the TPMKEK encrypted by the replaced DRM license server's key is added.

At step 354, the head-end continues to distribute the new media to the seat-end as it is a normal process. As normal, the media is encrypted with the media keys. It should be appreciated that after revocation, the new media is still distributed, however the passengers cannot play such media until the revocation is reversed, such as the revoked head-end server is replaced with a valid server.

In another embodiment, the new media is still distributed, however the passengers cannot play such media until the revocation is reversed, such as the selectively revoked seat-end smart monitor acting as a DRM server is replaced with a valid seat-end smart monitor acting as a DRM server.

Figure 4:
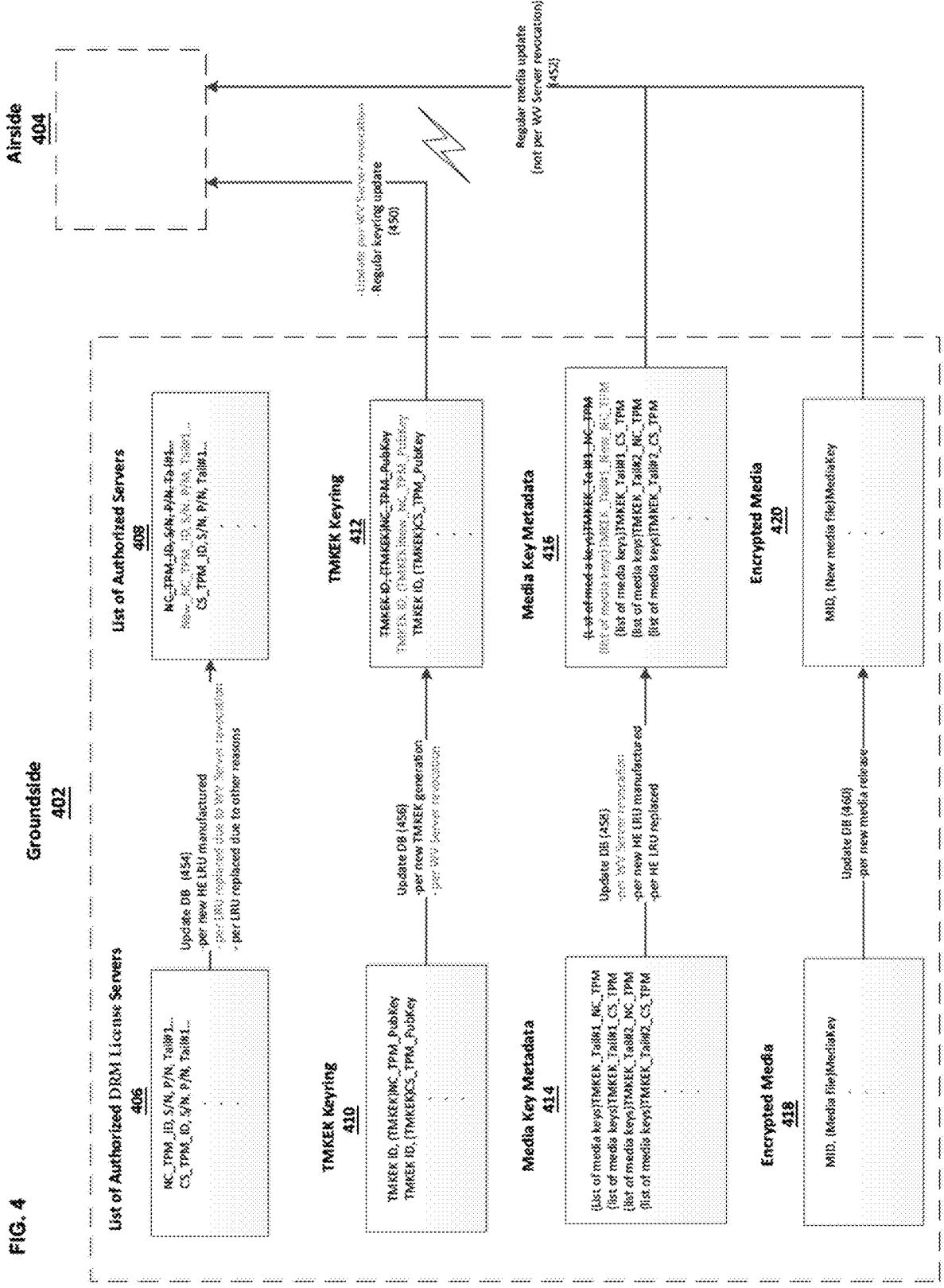
FIG. 4 is a schematic diagram of the revocation process, in accordance with embodiments of the disclosed technology.

A revocation process according to an embodiment can be understood with reference to FIG. 4. The groundside control system 402 (groundside) is communicably connected to an airside server 404. Groundside 402 is configured to include functionality for storing and updating a list of authorized servers (shown as 406 and updated 408); functionality for storing and updating a TMKEK keyring (shown as 410 and 412, respectively); functionality for storing and updating a media key metadata (shown as 414 and updated 416); and functionality for storing and updating encrypted media (shown as 418 and 420, respectively).

In an embodiment, at step 454, the list of authorized servers database is updated. The update may be caused by a new head-end server LRU being manufactured and replacing the revoked head-end server. It should be appreciated that the head-end LRU may be replaced due to other reasons than a media-related entity on the aircraft being compromised. The updated list removes the revoked LRU and adds the new LRU.

At step 456, the TMKEK keyring database is updated per generation of a new TMKEK, and per revoked DRM license server being replaced.

At step 450, the updated TMKEK keyring is transmitted from groundside to the aircraft via. The transmission may occur in response to the updated DRM license server revocation or during regular keyring update transmissions.

At step 458, the media key metadata database is updated per the DRM license server revocation, per the new head-end LRU being manufactured, and per the head-end LRU being replaced.

At step 460, the encrypted media database is updated caused by a new media release, as in the normal process.

At step 452, the media update transmission takes place and this is during regular media updates and not dependent on the revocation process of a DRM license server.

It should be appreciated that while the above revocation process was described with respect to a head-end DRM license server being revoked, another embodiment includes these steps where the server being revoked is the smart monitor.

It should be appreciated that embodiments herein support a consistent architectural design for AVOD clients to source media from either other in-seat monitors within the cabin or from AVOD streaming servers at the head-end of the aircraft. The in-seat monitors that are available to provide AVOD services to other in-seat monitors (servers) provide both the media and the media's DRM license to the client.

As mentioned above, a single DRM license server revocation mechanism for the entire aircraft is provided. The head-end DRM license server is revoked, in case that either the smart monitor servers in the cabin or the AVOD streaming servers at the head-end are compromised. In another embodiment, hybrid systems without such head-end server can still support DRM requirements.

Figure 5:
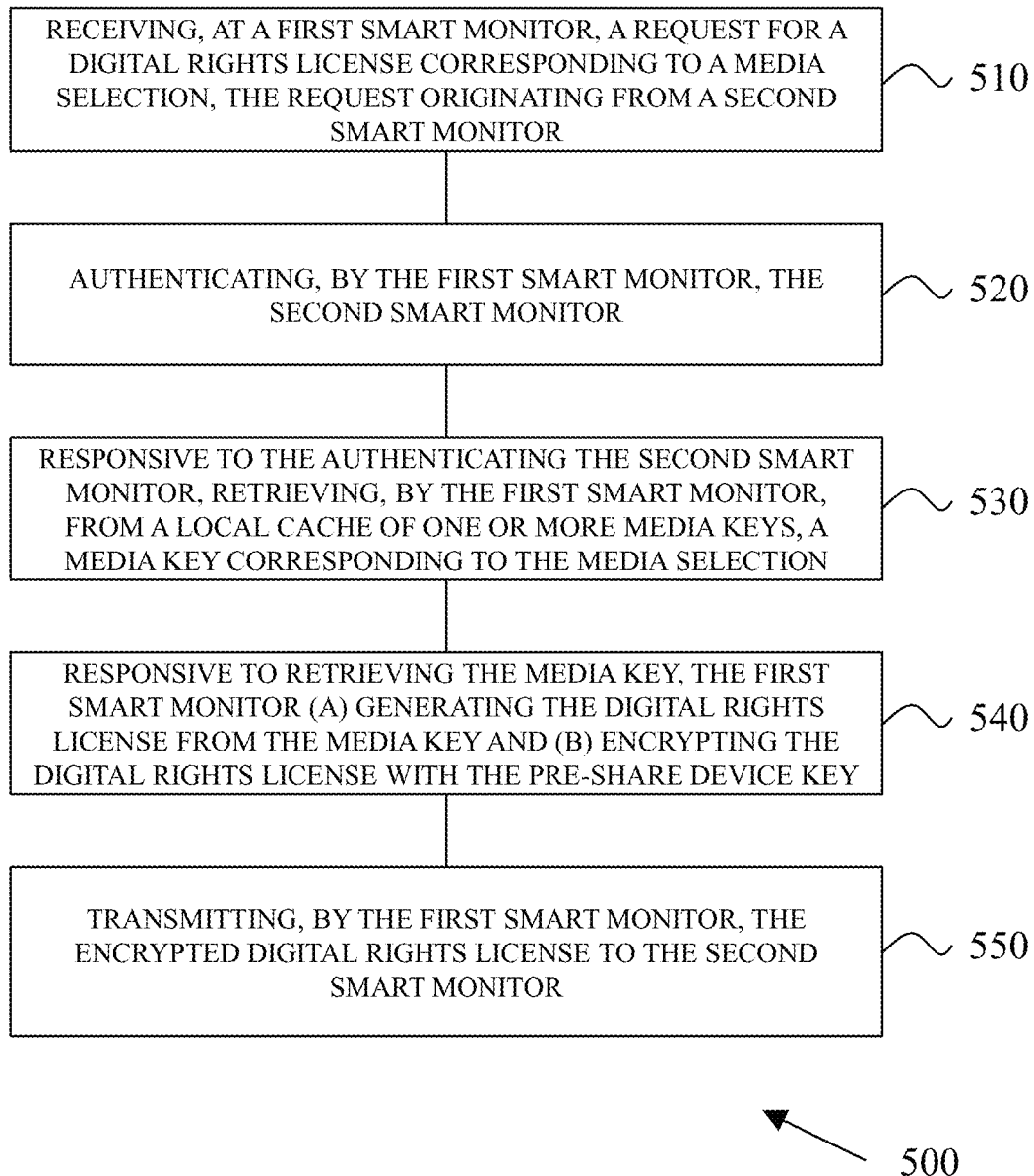
FIG. 5 shows a flowchart for an example of a method for providing secure entertainment on a vehicle for passengers, in accordance with embodiments of the disclosed technology.

FIG. 5 shows a flowchart for an example of a method for providing secure entertainment on a vehicle for passengers. The method 500 includes, at step 510, receiving, at a first monitor (e.g., 202 in FIG. 2), a request (e.g., at step 258 in FIG. 2) for a digital rights license corresponding to a media selection (e.g., from step 252 in FIG. 2). The request may originate from a second monitor (e.g., 204 in FIG. 2). The first and second monitors may be, for example, in-seat monitors used for IFE.

The method 500 includes, at step 520, authenticating (e.g., at step 260a in FIG. 2), by the first monitor, the second monitor.

The method 500 includes, at step 530, responsive to the authenticating the second monitor, retrieving (e.g., at step 262 in FIG. 2), by the first monitor, from a local cache of one or more media keys (e.g., 214 of FIG. 2), a media key (e.g., transmitted at step 262 in FIG. 2) corresponding to the media selection.

The method 500 includes, at step 540, responsive to retrieving the media key, the first monitor (a) generating (e.g., at 210 in FIG. 2) the digital rights license from the media key and (b) encrypting (at 210 in FIG. 2) the digital rights license with the pre-share device key.

The method 500 includes, at step 550, transmitting (e.g., step 264 in FIG. 2), by the first monitor, the encrypted digital rights license to the second monitor (e.g., at 208 in FIG. 2).

In another exemplary aspect, a method for providing entertainment on a vehicle for passengers is disclosed. The method includes receiving, by a server on the vehicle, a plurality of media files encrypted with a plurality of media keys corresponding to the media files and the plurality of media keys, the media keys used onboard the vehicle to decrypt the media files; storing, by the server, the encrypted media files in a local content storage and the media keys corresponding to the media files in a local media key storage; distributing, by the server to one or more monitors on the vehicle, one or more of the encrypted media files and the corresponding media keys; subsequent to distributing the one or more encrypted media files and the corresponding keys, receiving, by the server from a monitor of the one or more monitors and over transport layer security, a request for specific media keys corresponding to specific encrypted media files stored on the monitor; responsive to receiving the request for specific media keys, authenticating, by the server, the monitor; responsive to authenticating the monitor, retrieving, by the server, the requested specific media keys from the local media key storage; responsive to retrieving the requested specific media keys from the local media key storage, decrypting, by the server, the retrieved specific media keys to clear-text; responsive to decrypting the retrieved specific media keys to clear-text, encrypting, by the server, the clear-text media keys with a key corresponding to the device; and transmitting, by the server, the encrypted clear-text media keys to the monitor.

Additionally, the request for specific media keys comprises credentials of the monitor and media identifiers corresponding to the encrypted media files stored on the monitor and wherein authenticating further comprises using the credentials. Additionally, retrieving the requested specific media keys from the local media key storage uses the media identifiers.

Additionally, the key corresponding to the device is contained in the request for specific media keys from the monitor.

Additionally, access to the media key storage is protected by a hardware root of trust deployed on the server by requiring a transient key encrypted by a unique key in the hardware root of trust and wherein the unique key is configured to be revocable.

In another exemplary aspect, a method for revoking a server on a vehicle for passengers that provides entertainment is disclosed. The method includes updating, by a control system processor, a digital list of one or more authorized servers by removing from the digital list a server that is identified as to be revoked; updating, by the control system processor, an encrypted keyring file by removing security credentials corresponding to the server identified as to be revoked from the encrypted keyring file; and transmitting, by the control system processor to a receiver on the vehicle, the updated encrypted keyring file.

Additionally, the method comprises adding, by the control system processor, to the list of one or more authorized servers a new authorized server.

Additionally, the method comprises adding, by the control system processor, to the encrypted keyring file new security credentials corresponding to a new authorized server.

Additionally, the control system is deployed on the ground and the vehicle is an aircraft.

Additionally, transmitting the updated encrypted keyring file is during a routine keyring update process.

Additionally, the method comprises updating a media key metadata database by removing, by the control system processor, from the media key metadata database, a list of media keys encrypted with a unique key corresponding to the server identified as to be revoked.

Additionally, the method comprises transmitting, by the control system processor to a receiver on the vehicle, the updated media key metadata database during a routine media update process.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Figure 6:
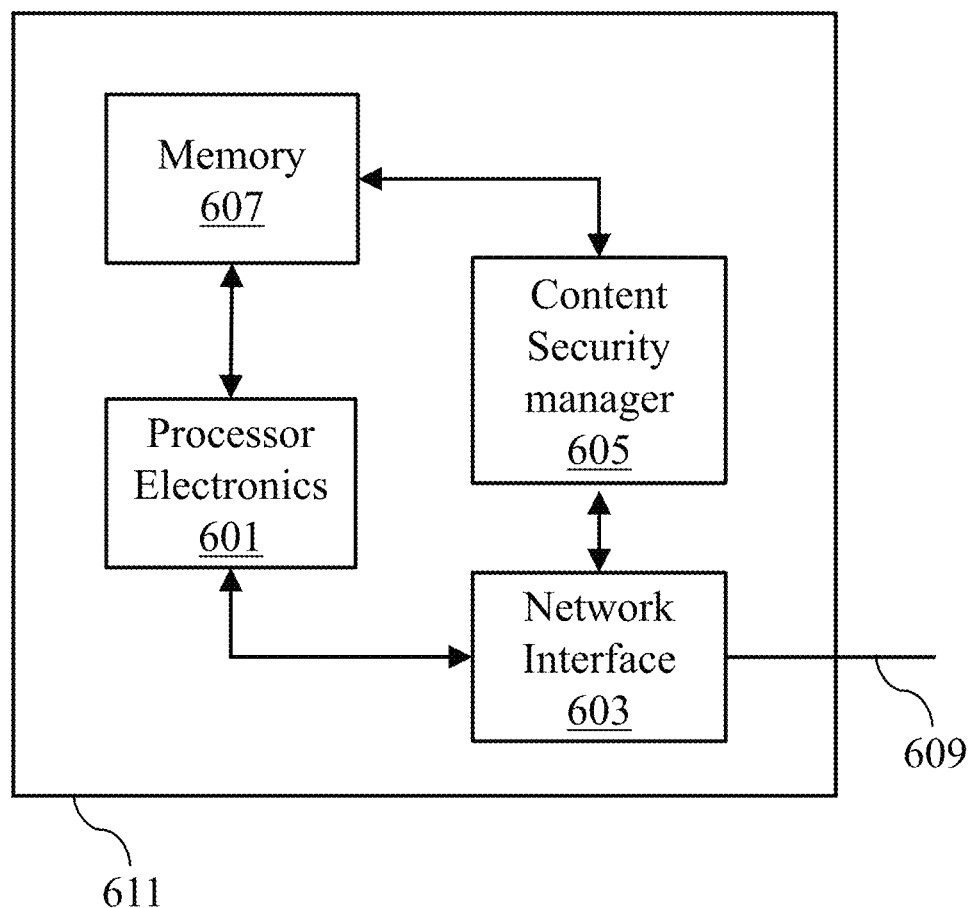
FIG. 6 shows a block diagram of an example device that can implement embodiments of the disclosed technology.

FIG. 6 is a block diagram representation of a portion of a device, in accordance with some embodiments of the presently disclosed technology. A device 611 can include processor electronics 601 such as a microprocessor that implements one or more of the techniques presented in this document. The device 611 can include a network interface 603 to send and/or receive data over one or more communication interfaces 609 (e.g., Ethernet). Device 611 can include one or more memories 607 configured to store information such as data and/or instructions. Device 611 can further include content security manager 605, which may include the TPM. In some implementations, the processor electronics 601 can include at least a portion of the network interface 603 and/or the content security 605. In some embodiments, at least some of the disclosed techniques, modules or functions are implemented using the device 611. For example, the device 611 may be used to implement the monitor that performs the method 500. In such embodiments, the device 611 may store portions of media files, encryption keys and certificates in the one or more memories 607.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that are known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this patent document.

What is claimed is:

1. A method for providing entertainment on a vehicle for passengers, the method comprising:
   receiving, at a first monitor, a request for a digital rights license corresponding to a media selection, the request originating from a second monitor;
   authenticating, by the first monitor, the second monitor;
   responsive to the authenticating the second monitor, retrieving, by the first monitor, from a local cache of one or more media keys, a media key corresponding to the media selection;
   responsive to retrieving the media key, the first monitor (a) generating the digital rights license from the media key and (b) encrypting the digital rights license with a pre-share device key corresponding to the second monitor; and
   transmitting, by the first monitor, the encrypted digital rights license to the second monitor;
   wherein the first monitor and the second monitor are each disposed on the vehicle;
   wherein the first monitor is configured to present media selections on a passenger interface corresponding to media files stored on the vehicle and receive an input from the passenger interface for playing one of the media selections;
   wherein the first monitor is further configured to store at least a subset of the media files in a local media content storage.

2. The method of claim 1, further comprising:
   transmitting, by the first monitor to the second monitor, at least a portion of a media file corresponding to the media selection, the at least a portion of the media file being stored in the local media content storage and the at least a portion of the media file being encrypted with the media key.

3. The method of claim 1, wherein the digital rights request comprises (a) a device identifier corresponding to the second monitor and a second monitor credential and (b) a media identifier corresponding to the media selection, wherein the device identifier and the credential are encrypted with the pre-share device key corresponding to the second monitor.

4. The method of claim 1, wherein the first monitor is further configured to recognize that a particular media selection in the received input from a passenger is stored on a particular monitor of a plurality of monitors on the vehicle.

5. The method of claim 1, wherein the first monitor comprises a hardware-based trusted execution environment that is configured to (a) receive a request for a digital rights license for a specific media, (b) encrypt a device identifier corresponding to the first monitor with device key corresponding to the first monitor, and (c) receive a digital rights license and media key encrypted with the device key, decrypt the digital rights license and the media key, and use the media key to decrypt at least a portion of an encrypted media file stored in the local media content storage.

6. The method of claim 5, wherein the encrypted at least a portion of the media file is sourced from a server on the vehicle or sourced from another monitor.

7. The method of claim 1, wherein the local cache of one or more media keys is protected by a hardware root of trust deployed on the first monitor by requiring a transient key encrypted by a unique key in the hardware root of trust and wherein the unique key is tracked such that if that monitor is reported lost or stolen, that monitor is revoked from access to the media keys by either adding that unique key to a revocation list or no longer encrypting the transient key with its revoked unique key.

8. The method of claim 1, further comprising:
   checking, by the first monitor, whether for each media file stored in the local media content storage a corresponding media key is stored in the local cache of one or more media keys.

9. The method of claim 1, further comprising:
   upon determining, by the first monitor, that the local cache of one or more media keys does not contain a media key that corresponds to a media file, the first monitor generating and transmitting a request to a server on the vehicle for the media key, wherein the server stores media keys corresponding to the media files on the vehicle.

10. The method of claim 9, wherein the request includes a credential of the first monitor and media identifiers corresponding to the media files stored in the local media content storage.

11. The method of claim 10, further comprising:
responsive to transmitting the request to the server for the media key:
receiving, over a secure transport layer connection, clear-text media keys corresponding to the list of media files, the clear-text media keys encrypted with the pre-shared device key of the first monitor; and
adding the encrypted clear-text media keys to the local cache of one or more media keys using respective media identifiers.

12. An apparatus for providing entertainment on a vehicle for passengers, comprising:
a processor; and
a non-transitory memory with instructions thereon, wherein the instructions upon execution by the processor cause the processor to:
receive, at a first monitor, a request for a digital rights license corresponding to a media selection, the request originating from a second monitor;
authenticate, by the first monitor, the second monitor;
responsive to authenticating the second monitor, retrieve, by the first monitor, from a local cache of one or more media keys, a media key corresponding to the media selection;
responsive to retrieving the media key, the first monitor (a) generate the digital rights license containing the media key and (b) encrypt digital rights license with the pre-share device key; and
transmit, by the first monitor, the encrypted digital rights license to the second monitor;
wherein the first monitor and the second monitor are each disposed on the vehicle;
wherein the first monitor is configured to present media selections to passengers corresponding to media files stored on the vehicle and receive an input from a passenger for playing one of the media selections;
wherein the first monitor is further configured to store at least a subset of the media files in a local media content storage.

13. The apparatus of claim 12, wherein the digital rights request comprises (a) a device identifier corresponding to the second monitor and a second monitor credential and (b) a media identifier corresponding to the media selection, wherein the device identifier and the credential are encrypted with a pre-share device key corresponding to the second monitor.

14. The apparatus of claim 12, wherein the first monitor comprises a hardware-based trusted execution environment that is configured to (a) receive a request for a digital rights license for a specific media, (b) encrypt a device identifier corresponding to the first monitor with device key corresponding to the first monitor, and (c) receive a digital rights license and media key encrypted with the device key, decrypt the digital rights license and the media key, and use the media key to decrypt at least a portion of an encrypted media file stored in the local media content storage.

15. The apparatus of claim 12, wherein the local cache of one or more media keys is protected by a hardware root of trust deployed on the first monitor by requiring a transient key encrypted by a unique key in the hardware root of trust and wherein the unique key is tracked such that if that monitor is reported lost or stolen, that monitor is revoked from access to the media keys by either adding that unique key to a revocation list or no longer encrypting the transient key with its revoked unique key.

16. A non-transitory computer-readable medium having data stored therein representing software executable by a computer, the software comprising instructions for providing entertainment on a vehicle for passengers, the non-transitory computer-readable medium comprising:
instructions for receiving, at a first monitor, a request for a digital rights license corresponding to a media selection, the request originating from a second monitor;
instructions for authenticating, by the first monitor, the second monitor;
instructions for, responsive to authenticating the second monitor, retrieving, by the first monitor, from a local cache of one or more media keys, a media key corresponding to the media selection;
instructions for, responsive to retrieving the media key, the first monitor (a) generating the digital rights license containing the media key and (b) encrypting digital rights license with the pre-share device key; and
instructions for transmitting, by the first monitor, the encrypted digital rights license to the second monitor;
wherein the first monitor and the second monitor are each disposed on the vehicle;
wherein the first monitor is configured to present media selections to passengers corresponding to media files stored on the vehicle and receive an input from a passenger for playing one of the media selections;
wherein the first monitor is further configured to store at least a subset of the media files in a local media content storage.

17. The non-transitory computer-readable medium of claim 16, wherein the digital rights request comprises (a) a device identifier corresponding to the second monitor and q second monitor credential and (b) a media identifier corresponding to the media selection, wherein the device identifier and the credential are encrypted with a pre-share device key corresponding to the second monitor.

18. The non-transitory computer-readable medium of claim 16, wherein the first monitor comprises a hardware-based trusted execution environment that is configured to (a) receive a request for a digital rights license for a specific media, (b) encrypt a device identifier corresponding to the first monitor with device key corresponding to the first monitor, and (c) receive a digital rights license and media key encrypted with the device key, decrypt the digital rights license and the media key, and use the media key to decrypt at least a portion of an encrypted media file stored in the local media content storage.

19. The non-transitory computer-readable medium of claim 16, wherein the local cache of one or more media keys is protected by a hardware root of trust deployed on the first monitor by requiring a transient key encrypted by a unique key in the hardware root of trust and wherein the unique key is tracked such that if that monitor is reported lost or stolen, that monitor is revoked from access to the media keys by either adding that unique key to a revocation list or no longer encrypting the transient key with its revoked unique key.

* * * * *